(12) United States Patent
Li et al.

(10) Patent No.: US 9,338,234 B2
(45) Date of Patent: May 10, 2016

(54) FUNCTIONAL PROGRAMMING IN DISTRIBUTED COMPUTING

(71) Applicant: Microsoft Technology Licensing, LLC, Redmond, WA (US)

(72) Inventors: Jin Li, Sammamish, WA (US); Sanjeev Mehrotra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 14/254,795

(22) Filed: Apr. 16, 2014

(65) Prior Publication Data

US 2015/0304420 A1 Oct. 22, 2015

(51) Int. Cl.
*G06F 21/10* (2013.01)
*H04L 29/08* (2006.01)
*H04L 29/06* (2006.01)

(52) U.S. Cl.
CPC ............ *H04L 67/1097* (2013.01); *G06F 21/10* (2013.01); *H04L 29/06* (2013.01); *H04L 67/02* (2013.01)

(58) Field of Classification Search
CPC .... H04L 29/06; H04L 29/08072; G06F 21/10
USPC .............................. 709/203, 220; 717/749, 40
See application file for complete search history.

(56) References Cited

U.S. PATENT DOCUMENTS

| 6,393,583 B1 * | 5/2002 | Meth .................... G06F 11/1458 714/12 |
| 7,171,749 B2 * | 2/2007 | Kaneko .................. B60K 15/04 137/590 |
| 7,263,689 B1 | 8/2007 | Edwards et al. |
| 7,650,331 B1 | 1/2010 | Dean et al. |
| 8,473,906 B2 | 6/2013 | Pan et al. |
| 8,495,603 B2 * | 7/2013 | Archer .................... G06F 8/443 717/140 |
| 8,997,172 B2 * | 3/2015 | Wookey .................. G06F 21/10 726/1 |
| 2012/0117611 A1 * | 5/2012 | Wookey .................. G06F 21/10 726/1 |
| 2012/0185437 A1 | 7/2012 | Pavlov et al. |
| 2013/0007088 A1 | 1/2013 | Alfredo et al. |
| 2013/0254196 A1 | 9/2013 | Babu et al. |
| 2013/0263151 A1 | 10/2013 | Li et al. |

FOREIGN PATENT DOCUMENTS

| CN | 101446898 | 6/2011 |
| WO | WO2012110079 | 8/2012 |
| WO | WO2013153029 | 10/2013 |

OTHER PUBLICATIONS

Li, et al., "Mutualcast: An Efficient Mechanism for One-to-Many Content Distribution," ACM Sigcomm Asia '04, Beijing, China, Apr. 2004, 10 pages.

Yu, et al., "DryadLINQ: A System for General-Purpose Distributed Data-Parallel Computing Using a High-Level Language", Proceedings of the 8th USENIX Conference on Operating System Design and Implementation, Dec. 2008, 14 pages.

Zaharia et al., "Resilient Distributed Datasets: A Fault-Tolerant Abstraction for In-Memory Cluster Computing", Proceedings of the 9th USENIX Conference on Networked Systems Design and Implementation, Apr. 2012, 14 pages.

* cited by examiner

*Primary Examiner* — Khanh Dinh

(74) *Attorney, Agent, or Firm* — Steve Wight; Sandy Swain; Micky Minhas

(57) ABSTRACT

Disclosed herein are systems and methods for executing programs written in functional style. A distributed computing system receives a program that expresses computation upon one or more sets of distributed key-value pairs (DKVs) and one or more global variables (GVs). The system distributes an assembly that includes at least a compiled binary of the program to the nodes of a computing cluster, with different portions of the DKVs being stored across the plurality of nodes of the computing cluster. The system causes execution of the assembly by each of the plurality of nodes of the computing cluster, the ones of the plurality of nodes executing the assembly using the different portions of the one or more DKVs stored thereon.

20 Claims, 5 Drawing Sheets

FUNCTIONAL PROGRAMMING IN DISTRIBUTED COMPUTING

BACKGROUND

Computation on large data sets presents special problems in the field of computer science. As data sets expand in size, the data no longer fits within the memory footprint of an individual device. Distributed computing is one way to handle computations performed on the large data set, but distributed computing is complex. Software to be executed on multiple processors or processor cores is more complex than software to be executed on a single processor. Distributing the computation to processors on multiple devices, each storing a portion of a distributed data set, adds still more complexity. For these reasons, the programmer's job is made more difficult in a distributed computing environment.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present description include distributed computing systems that execute programs expressing computation upon two entities: sets of distributed key-value pairs (DKV) and global variables (GVs). A DKV is a data set of pairs of attributes and associated values (known as attribute-value pairs, key-value pairs, as well as other things). The DKV is typically too large to fit into the storage footprint of a single computing device, and is partitioned and stored across a cluster of computing nodes. A GV is a global value that is shared with all nodes in the cluster and/or aggregated from all nodes in the cluster during or at the conclusion of execution of the program. DKV and GV are immutable objects.

The distributed computing system provides a set of programming primitives that are available to be called by programs executing on the distributed computing system. A programmer defines a kernel function that is distributed to the nodes of the computing cluster. The primitives include functions that can be performed on the distributedly stored DKV, as well the GV, thereby handling the underlying complexity of the interconnections, communications, and GV aggregation of the distributed execution within the cluster.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments of the present description include a distributed computing system that includes a cluster of computing nodes storing a large data set in a distributed fashion across the computing nodes. The distributed computing system enables computation on the large data set with programs written in a functional programming style. Functional programming is a programming paradigm that utilizes mathematical functions and that eliminates program state and mutable objects. Distributed computing systems according to embodiments execute programs that express computation upon two entities: sets of distributed key-value pairs (DKV) and global variables (GVs). A DKV is a large data set of pairs of attributes and associated values (known as attribute-value pairs, key-value pairs, as well as other things) and that is partitioned and stored across the cluster. A GV is a global value that is shared with all nodes in the cluster and/or aggregated from all nodes in the cluster during or at the conclusion of execution of the program.

A DKV is partitioned and individual portions of the DKV are stored on individual nodes of a single computing cluster. In some embodiments, a node is a single computing device, which may be a multi-processor device. In other embodiments a node is a virtual machine. DKV and GV are immutable objects, and in embodiments the original versions of DKVs and GVs are not altered; instead, changes to DKV and GV during execution result in the creation of a new DKV and/or GV.

The distributed computing system provides a set of programming primitives that are available to be called by programs executing on the distributed computing system. A programmer defines a kernel function (e.g., a function within the program) that is distributed to the nodes of the computing cluster; the kernel function calls one or more of the primitives provided by the distributed computing system. The primitive includes functions that can be performed on the distributedly stored DKV, as well the GV, thereby taking care of the underlying complexity of the interconnections, communications, and GV aggregation of the distributed execution within the cluster. Embodiments therefore enable easier programming of complex distributed computing functions. In some embodiments, the user is enabled to define various program execution parameters, such as a storage parameter, a reliability parameter, and a partition parameter that determines how the DKV is stored and partitioned in the cluster.

The devices, processes, and systems described herein may be implemented in a number of ways. Example implementations are provided below with reference to the following figures.

Example Environment

Figure 1:
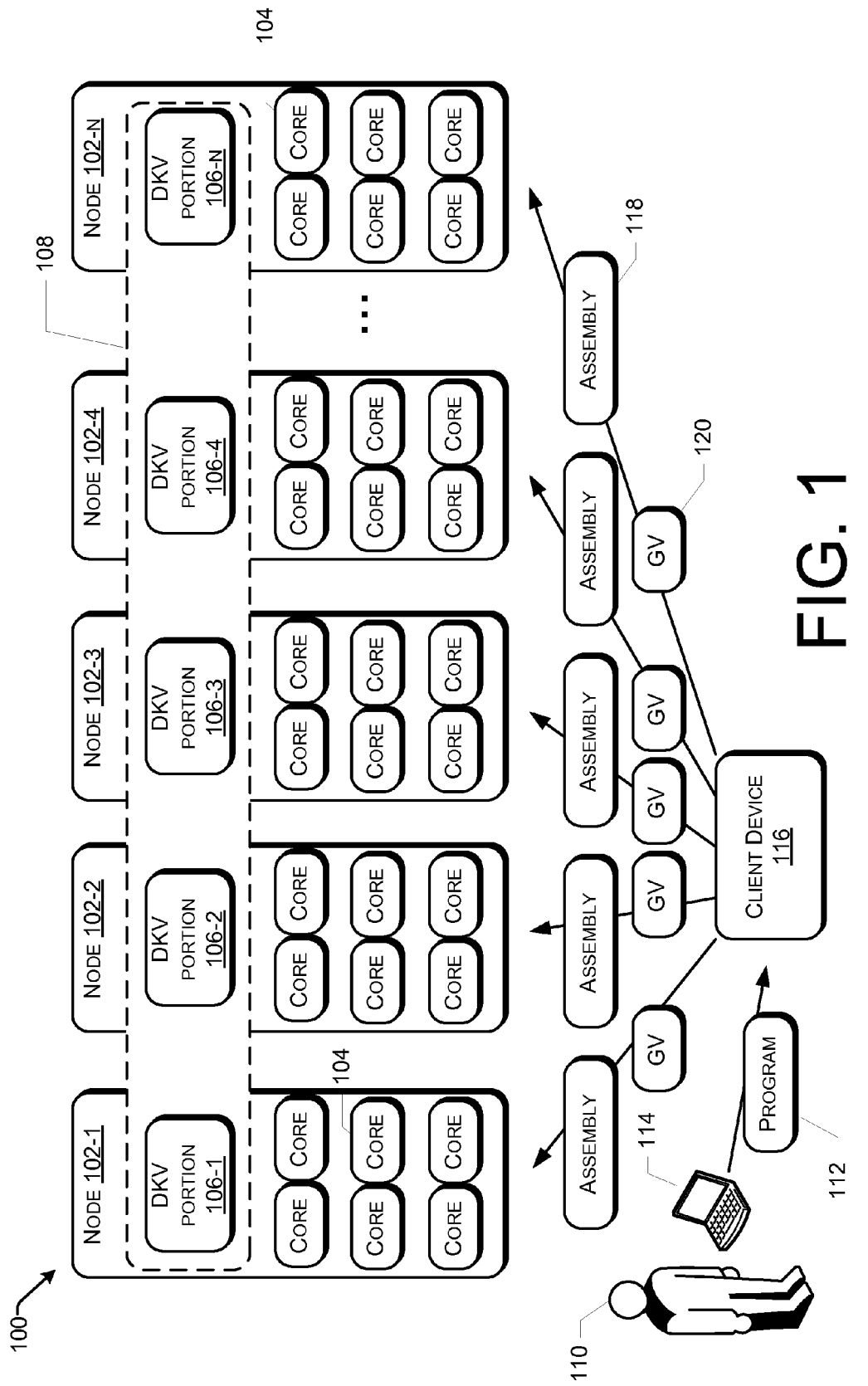
FIG. 1 is a block diagram of an example distributed computing system that executes distributed programs written in a functional style in accordance with various embodiments.

FIG. 1 is a block diagram of an example distributed computing system 100 that executes distributed programs written in a functional style in accordance with various embodiments. The computing system 100 includes a plurality of nodes 102, and each node includes one or more processors 104 or processor cores 104. Portions 106 of a distributed key-value pair set (DKV) 108 are stored on different ones of the nodes 102. As used herein, a cluster includes a plurality of nodes 102 that collectively store all portions of a DKV 108. A node 102, in other embodiments, may also be a virtual machine, such as may be executed within a cloud computing environment.

As will be described in more detail elsewhere within this Detailed Description, a user 110 is enabled by the distributed computing system 100 to write a program 112 in a functional style. A user device 114 transmits either the program 112 or a compiled binary of the program 112 to a client device 116. Although shown as a separate device than nodes 102, the client device 116 may be, in some embodiments, a node 102 on which a portion 106 of the DKV 108 is stored, and which participates in the distributed execution of the program 112 as will described in more detail elsewhere within this Detailed Description. The client device 116 is illustrated as being separate from the nodes 102 for the sake of illustration only.

Where the client device 116 receives the program 112, the client device 116 compiles or otherwise causes the program 112 to be compiled. The client device 116 prepares an assembly 118, which includes at least the compiled binary of the program 112. Preparing the assembly 118 includes, in some embodiments, compiling the program 112 into a compiled binary. In various embodiments, the assembly 118 includes one or more compiled code, (either managed or unmanaged), data files, configuration files, and so forth.

The program 112 expresses computation on one or more DKVs, such as DKV 108 and on one or more GVs, including GV 120. The distributed computing system 100 distributes the assembly 118 to the nodes 102 of the cluster associated with the DKV 108. The client device 116 establishes communication links with the nodes 102 of the cluster, and distributes the assembly 118 to the nodes via the established communication links. The communication links may include unicast links, multicast links, peer-to-peer (P2P) connections amongst the nodes 102, or other link types and topologies. Where the program 112 includes an initial value for a GV, such as with GV 120, the client device 116 distributes the GV 120 to the nodes 102 using the same or different links as are used to distributed the assembly 118. The program 112 may express a resulting value for one or more GVs, which may serve as the outcome or intermediate result of the execution, and such GVs may be aggregated by the nodes 102 and passed back to the client device 116 and/or distributed amongst the nodes 102 for further execution associated with the program 112, such as another iteration of the program 112.

As noted above, a cluster of nodes 102 includes those nodes on which portions of the DKV 108 are stored. The program 112 may express computation on more than one DKV; in those instances, portions of other DKVs are also stored in a distributed manner across the cluster of nodes 102 or in a different cluster. A distributed function job associated with the program 112 may involve multiple clusters. In various embodiments, clusters include one or more of a group of computing nodes in an enterprise, a group of virtual machines in a cloud computing environment, a group of computing nodes equipped with general-purpose computing on graphics processing units (GPGPU) technology, and so forth. Where a cluster includes GPGPU technology, the assembly 118 includes GPGPU code compiled from the program 112.

At the beginning of a distributed computing job associated with the program 112, nodes 102 within and between clusters establish communication connections, which may then be torn down at the end of the execution of program 112, or when those communication connections are no longer needed during the execution of the program 112. The distributed computing system 100 handles failure and redundancy within the cluster, such as by establishing a back-up node 102 or other measure.

Execution Parameters

The DKV 108 is a set of data, which can be expressed as $\{(k_1, v_1), (k_2, v_2), \ldots, (k_n, v_n)\}$. The DKV 108 may be too large to fit into the storage footprint of a single computing node 102 and instead resides on a single specific cluster of nodes 102. Also, computation parallelization can be achieved by storing the DKV 108 across multiple nodes 102. The user 110 specifies one or more execution parameters, such as a storage parameter, a reliability parameter, a partition parameter, or other. In some embodiments, the program 112 may specify the execution parameters.

A storage parameter may specify that the DKV 108 resides on one or more of: a hard disk drive (HDD) of one or more of the nodes 102, a solid state drive (SSD) such as flash memory or other solid state technology of one or more of the nodes 102, a Random Access Memory (RAM) of the nodes 102, other memory type, and/or a combination of the above. For example, the user 110 may determine that it is beneficial for the DKV 108 to reside in RAM during the job execution, such as to improve execution performance of the program 112 (because for example read operations to RAM are sometimes faster than read operations to some other memory types). Thus, the storage parameter would specify that the DKV 108 is to be stored in RAM via a storage parameter. In another example, the user 110 may determine, for a computational job with a strong locality for access of popular documents, that it is beneficial to put the DKV 108 on a HDD, with a frequently accessed portion of the DKV 108 being placed on a fast access memory tier (e.g., in SSD or RAM). Placing some of the DKV 108 on a HDD reduces storage costs. One or more storage parameters specify this storage arrangement.

The execution parameters may specify a reliability parameter. For example, data that is involved frequently in execution of the program 112 may be replicated into k copies, with each copy stored in a different node 102 in the cluster. For infrequently used data, the reliability parameter may provide that the DKV 108 is to be erasure-coded. For a transient version of the DKV 108 (e.g., an intermediate result of executing the program 112), the user 110 may specify no reliability parameter (although the user 110 may, in embodiments, specify a reliability parameter). In another example, a reliability parameter may specify that the DKV 108 is to be erasure coded using a (k,n) erasure code that splits data into k pieces, using Galois Field arithmetic to compute n-k new pieces, and to store the n pieces of data in n different nodes 102 in the cluster. For a DKV 108 that resides in RAM, the reliability parameter may specify that the replicated copy is stored in a secondary media. For example, for a DKV 108 for which k replication is specified in a reliability parameter, the primary copy of the DKV 108 resides in RAM, and the other k-1 copies of the DKV 108 reside in less expensive media (e.g., HDD, SDD, or other). In the event that the primary copy in RAM fails, the distributed computing system 100 instantiates another primary copy of the DKV 108 in RAM.

The DKV 108 is partitioned so that individual nodes 102 hold a portion of the data set. In some embodiments of the distributed computing system 100, partitioning of the DKV 108 is controlled by the user 110 and/or the program 112 specifying a partition parameter to store the DKV 108 via a partition function. One example partition function is P : k->i: in which k is the key, and i is partition number of the key. In one example, the partition function is a hash function with mod N, in which it distributes the data in DKV to roughly N equal partitions. In another example, the partition function is implemented through a consistent hashing table. A consistent hashing table allows for, if one node among a cluster of n nodes is down, a 1/n portion of the key-value pairs to be relocated among the cluster of nodes 102. Moreover, the 1/n portion may be equally distributed among the nodes 102, so that relocating it will not increase the load on the cluster.

A DKV 108 may be the source data and/or an end result of the distributed execution of the program 112. In some embodiments, there may be transient DKV 108, in which the key-value pairs in the transient DKV are computed through a set of functions from other DKVs. A transient DKV is defined as:

$$DKV=func(DKV\_1, DKV\_2, \ldots, DKV\_n, GV\_1, GV\_2, \ldots, GV\_n) \qquad \text{Eq. 1}$$

in which func is a user-defined function within the program 112. The user-defined function is compiled into the assembly 118, which is then distributed to the nodes 102 in the cluster for execution. DKV_1, ..., DKV_n are upstream DKVs that the transient DKV depend upon, each of which may be another transient DKV or a source DKV (e.g., the DKV 108). GV_1, ..., GV_n are global variables used in the computation expressed in the program 112.

Global Variables

Global variables (GV) are sets of data that are distributed amongst the nodes 102 in the cluster. A GV, such as the GV 120, may be source data to be distributed to the nodes 102 prior to execution of the program 112 within the distributed computing system 100. Also, a GV may be sink data that is collected upon execution of the program 112 by the nodes 102. A GV may also be an intermediate result of execution of the program 112.

During the start of execution of a job step (e.g., prior to an iteration of execution of program 112 or a portion of program 112), the GV 120 is communicated to the nodes 102 in the cluster. In one example, the client device 116 distributes the GV 120 to the nodes 102 through a unicast or broadcast communication. Alternatively, the GV 120 is distributed to the nodes using a peer-to-peer (P2P) communication mechanism, or in some other way.

At the end of execution of a job step, different ones of the nodes 102 will compute a different value for a GV (because the program 112 is executed on different portions of the DKV 108 at the different nodes 102). To provide a result of the execution (e.g., to provide a value for the GV resulting from the execution of the iteration of the program 112), the GV 120 is aggregated from the values for the GV 120 produced by the different nodes 102 in the cluster. In one embodiment, the nodes 102 use a unicast operation to provide the GV 120 to the client device 116, which then aggregates the values into an aggregated value for the GV 120. In other embodiments, a P2P communication mechanism is utilized to aggregate the different values for the GV 120. A particular example of a P2P communication mechanism employed in various embodiments is an inverse application multicast (reverse-ALM) tree.

Figure 2:
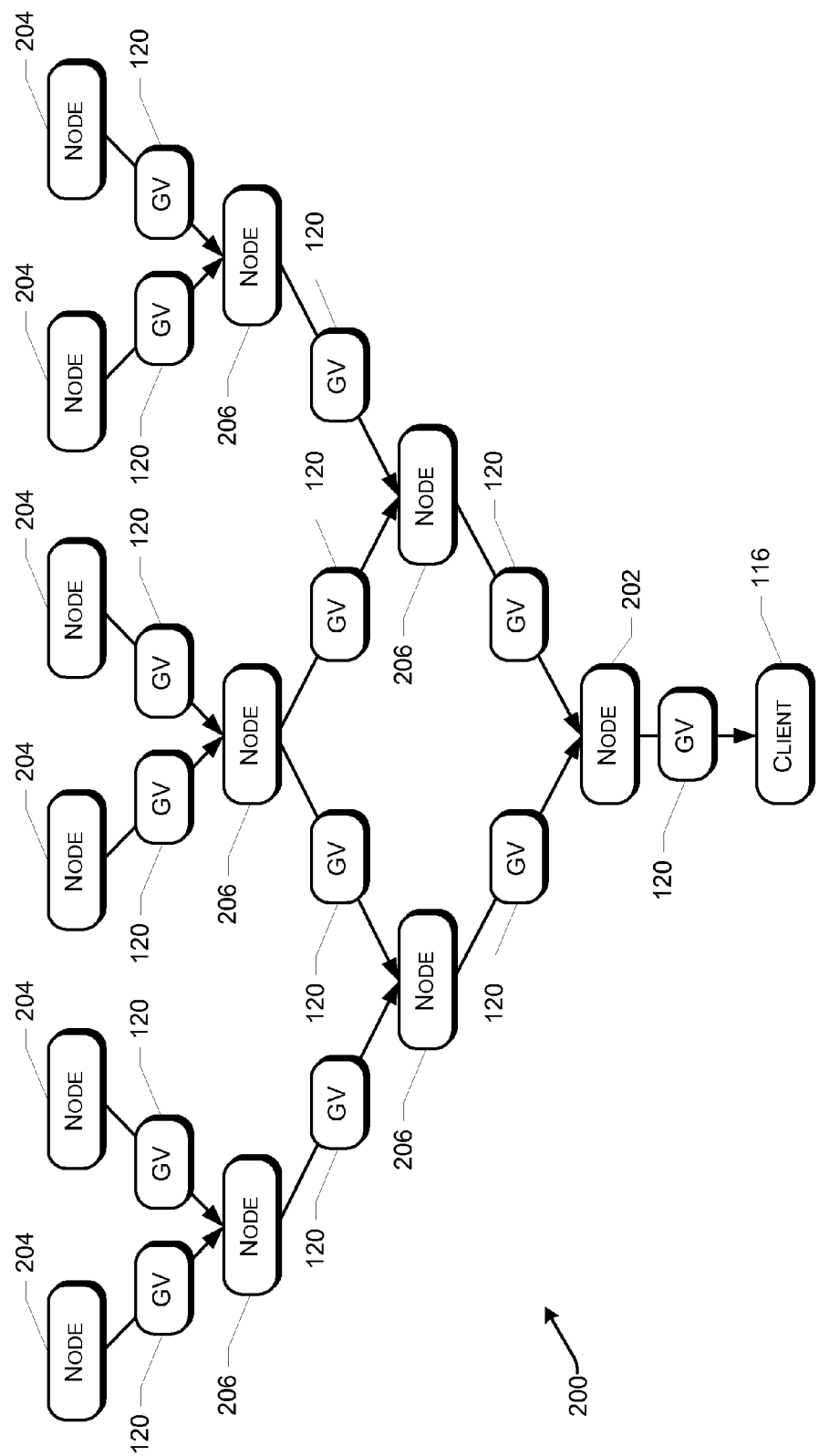
FIG. 2 illustrates a reverse-ALM tree for aggregating global variables in accordance with embodiments.

FIG. 2 illustrates a reverse-ALM tree 200 for aggregating global variables in accordance with embodiments. Reverse-ALM tree multicast involves constructing a tree 200, with a root node 202 (e.g., the client device 116 or node 102) being the head node of the reverse-ALM tree. The leaf nodes 204 of the reverse-ALM tree send their values for the GV 120 to their upstream nodes, which may be the root node 202 or an intermediate node 206. An intermediate node 206 waits for all of its downstream nodes to provide it with values for the GV 120, which may themselves be aggregated values for the GV 120 (such as where one or more of the downstream nodes are also intermediate nodes). The intermediate nodes 206 collect the values for GV 120 from the upstream nodes, wait for their own computations to produce local values for the GV 120, and then run an aggregation function (which may be specified by the program 112) on the different values for the GV 120, including their own, to produce an aggregated GV 120. The intermediate nodes 206 send the resultant value for the GV 120 to their upstream nodes, which may be the root node 202 or another intermediate node 206. In embodiments, if there are multiple GVs to be collected, the same or different reverse-ALM trees may be used to aggregate different GVs. Where multiple reverse-ALM trees are constructed, in some embodiments, each node 102 of the cluster has an equal chance to serve as a leaf node 204 and/or an intermediate node 206. Reverse-ALM trees may have a maximum tree depth and a maximum node fan-out. A maximum tree depth indicates the maximum number nodes 102 from a leaf node 204 to the root node 202, including the leaf nodes 204 and the root node 202. The GV 120 may be returned to the client device 116, such as at the end of the computation.

Figure 3:
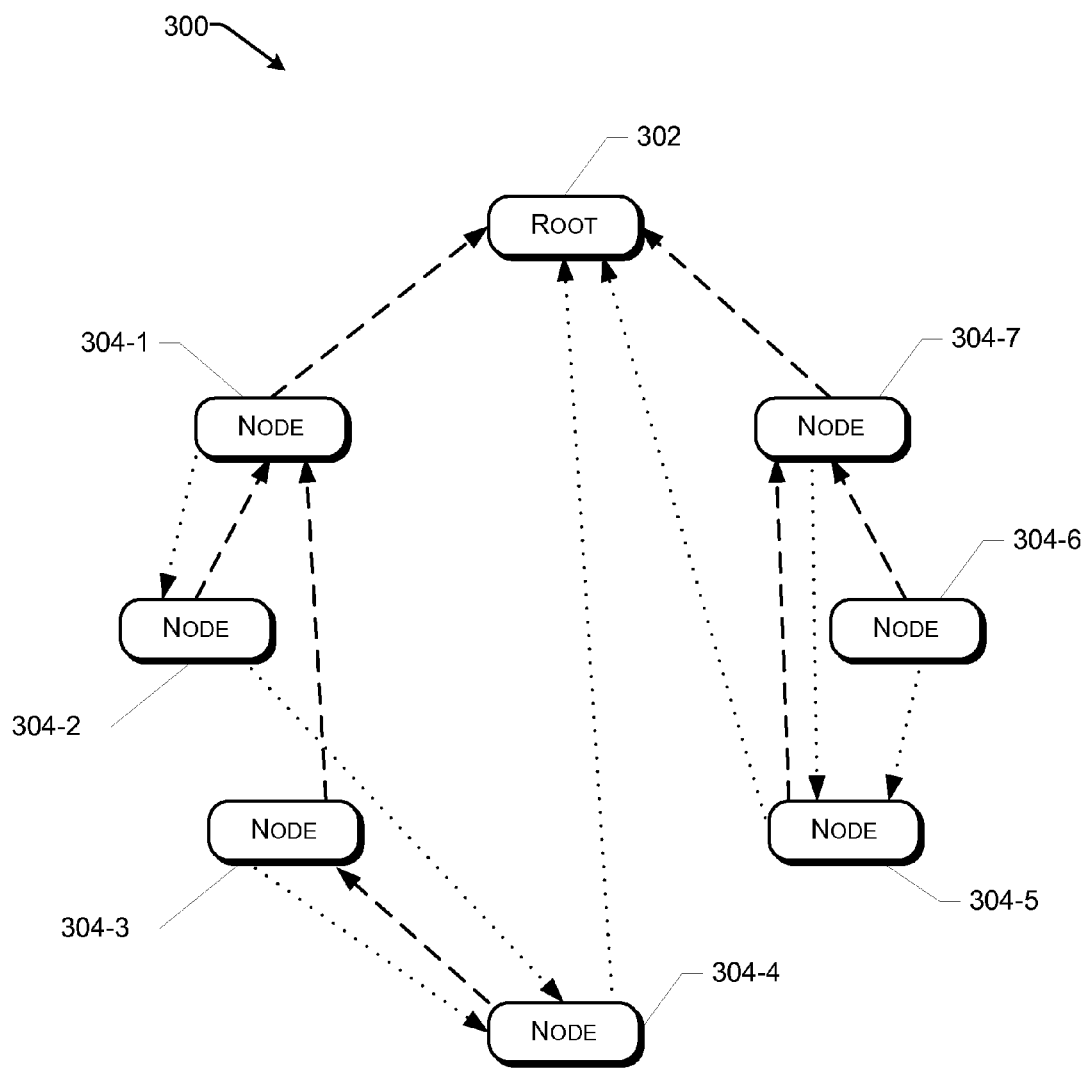
FIG. 3 illustrates an example of two reverse ALM trees in a cluster of seven nodes and a root node, in accordance with various embodiments.

FIG. 3 illustrates an example of two reverse ALM trees in a cluster 300 of seven nodes 304 and a root node 302. Two reverse ALM-trees, one represented by dashed lines in FIG. 3 and the other represented by dotted lines in FIG. 3, are constructed. In the particular example illustrated in FIG. 3, a maximum tree depth of three nodes and a maximum node fan-out of two are set. In this particular example, each of the nodes 304 acts as both a leaf node and as an intermediate node in one of the reverse-ALM trees.

Example System-Defined Functions

The distributed computing system 100 provides one or more system-defined functions, or primitives, which are kernel functions that the program 112 calls to perform various computations upon one or more DKVs, such as the DKV 108 and one or more GVs, such as the GV 120. The system-defined functions perform one or more distributed computing tasks on behalf of the program 112, including executing computation on a partition of DKV on the nodes 102, aggregating values for global variables, and so forth so that those functions do not have to be programmed by the user 110 into the program 112. Some of the system-defined functions accept one or more user-defined functions (e.g., functions written by the user 110), that control how the distributed computing tasks are performed, thereby providing the user 110 control over some aspects of the distributed computing tasks. In the following examples, dkv_1 is of type DKV<'K,'V> with keys of type 'K and values of type 'V; likewise, state1 is of state with type 'GV. Some example system-defined functions are (presented in no particular order):

a) DKV.aggregate ( ) dkv_1:DKV<'K,'V> dkv_2:DKV< 'K,'V> ... dkv_n:DKV<'K,'V>->finaldkv:DKV<'K,'V>

This function combines multiple DKVs, dkv_1, dkv_2, ..., dkv_n into a single DKV, finaldkv.

b) DKV.filter (fun (k:'K,v:'V)->bool) dkv_1:DKV<K,'V>->filterdkv:DKV<'K,'V>

This system-defined function applies a customized function (denoted as "fun") on the key-value pairs of dkv_1; only those key-value pairs of dkv_1 for which the customized function returns true are included in the output DKV, filterdkv c) DKV.filterbyKey (fun k:'K->bool) dkv_1:DKV<'K,'V>-22 filterdkv:DKV<'K, 'V>

This function applies the customized function ("fun") on the key values of dkv_1; only those key-value pairs in dkv_1 for which the customized function (applied to the key portions of the key-value pairs) returns true are included in the in the output DKV, filterdkv.

d) DKV.choose (fun (k:'K,v:'V)->(k1:'K1,v1:'V1) option) dkv_1:DKV<'K,'V>->filterdkv:DKV<'K1, 'V1>

This function calls for a customized function, which returns an option value of either Some (k1,v1) or None. Only those key-value pairs of dkv_1 in which the customized function returns Some are included in the in the output, filterdkv, with the output transformed to a DKV with key 'K1 and value 'V 1.

e) DKV.map (fun (k:'K,v:'V)->(k1:'K1, v1:'V1)) dkv_1: DKV<K,'V>->dkv_2:DKV<'K1, V1>

This function maps one DKV, dkv_1, to another DKV, dkv_2 (which may be of a different data type, DKV<K1, 'V1>) via a customized function.

f) DKV.fold (fun (k:'K,v:'V) state:'GV->'GV) (fun state1: 'GV state2: 'GV->'GV) initialState: 'GV dkv:DKV<'K,'V>->finalState:'GV The DKV fold function iterates through each key-value pair once. The first user defined function will be applied on each key-value pair in the DKV, with the results stored in a GV. The second user-defined function is applied to two values for the resulting GVs from two different nodes 102 (e.g., the GVs produced by the first user-defined functions from two different nodes 102), and produces another (e.g., aggregated) GV. Thus, the second user-defined function is an aggregation function. The distributed computing system 100 constructs a reverse-ALM tree, or other communication network, to share the different values for the GVs amongst the nodes 102 so that the nodes can be aggregated.

g) DKV.groupBy (fun (k:'K,v:'V)->(k1:'K1, v1:'V1)) dkv: DKV<'K,'V>->groupdkv:DKV<K1,List<'V1>>

This function applies a customized projection function, which transforms each key-value pair (k,v) in dkv_1 to an alternative form (k1,v1). The resultant DKV is aggregated, so that all values associated with the same key k1 are aggregated.

i) DKV.MapReduce (fun (k:'K,v:'V)->(k1:'K1, v1:'V1)) (fun (k1:'K1, list(v1):List<'V1>)->k2:'K2, v2:'V2) dkv: DKV<'K,'V>->finalkv:DKV<K2,'V2>

This function performs a MapReduce operation on a DKV. There are two customized functions, a map function and a reducer function. The customized map function converts each key-value pair (k, v) in the original DKV to another key-value pair (k1, v1). All values related to a particular key k1 are aggregated to form the list of values v1, list(v1). (k1, list(v1)) is sent to a customized reducer function, on which the result k2,v2 will be executed.

j) DKV.index (fun seq<(k:'K,v:'V)>->aggregatedvalue:'GV) (fun aggregatedvalue: 'GV, 'GV->'GV) term_lists:'GV dkv: DKV<'K,'V>->result:'GV2

The index operation implements indexing on the DKV. The term_lists is a source GV distributed to the nodes 102 in the cluster. For each node 102 in the cluster, the term_lists are used to retrieve a set of (k,v), where the key k is the term in the term_lists. The aggregated value is then fed into a customized function, (e.g., to aggregate a posting list and apply L1 ranking function in a search application). The result of the customized function is returned as a GV.

k) DKV.store s{ }:seq<('K,'V)>dkv:DKV<'K,'V>

This function stores a sequence, s, of key-value pairs (k,v) as a DKV to the distributed computing system 100.

l) DKV.read dkv:DKV<'K,'V>->s:seq<('K,'V)>

This function reads all key-values in a DKV back to a sequence. Where the DKV is originally stored via the DKV.store function, the order of retrieval in DKV.read is not guaranteed to be the same as in the DKV.store function.

m) DKV.load dkv:DKV<'K,'V>

This function loads a cached version of the DKV into the cluster.

Other example system-defined functions are possible without departing from the scope of embodiments.

Example Functional Programs

Two example programs 112 are next described. The first describes a k-means clustering algorithm implemented as a distributed program 112, with an original data set to be trained stored on the cluster of nodes 102 as a DKV. The second describes a search indexing function, with a reverse index (e.g., a posting list) stored as a first DKV in the cluster and a forward index stored as a second DKV within the cluster.

Given a set of original data points x_1, x_2, . . . , x_n in d-dimensional vector, k-means clustering aims to partition the n observations into k sets (or clusters, not to be confused with a cluster of nodes), so as to minimize the within-cluster sum of squares of the difference between the points in a partition and the centroid of the partition. That is, each data point x is assigned to a cluster whose centroid is the closest, whereas the cluster centroid can be updated by averaging all data points assigned to the cluster. The k-means clustering problem repeat update the above two steps, until either a certain number of iterations have completed or until the error (sum of squares) reaches a predetermined threshold. Pseudo code of an example distributed program 112 written in functional style is as follows. In the following pseudo-code examples, F# notation is used, such that for example (!x) means the value that "x" refers to, (not) refers to "not", and "not !x" refers to a value that "x" is not. In addition the return value of a function is the final statement in the function.

```
let job0 = OneNet {
    yield OnenetJob( Name = "k-means algorithm") // Define the Onenet job the
    program is associated with, if left undefined, a job with a random name will be created
    let fold_func (dataPtIndex, dataPt) (centroid, samples, error) =
        closestI = i so that SumOfSquares(centroid(i)-dataPt) minimized
        updatedCentroid(closestI) =
            (centroid(closestI)*samples(closestI)+dataPt)/(samples(closestI)+1)
        updatedSamples(closestI) = samples(closestI)+1
        updatedError(closestIndex) =
            UpdateError(updatedCentroid(closestI), SamplesInCentroid(closestI))
        (updatedCentroid, updatedSamples, updatedError) // return updated GV
    let aggregate_func (centroid1, samples1, error1) (centroid2, samples2, error2) =
        for i=0 to k-1 do
            updatedCentroid(i) =
                (centroid1(i)*samples1(i)+centroid2(i)*samples2(i)) /
                    (samples1(i)+samples2(i))
            updatedSamples(i) = samples1(i)+samples2(i)
            updatedError(i) =
                UpdateError(updatedCentroid(i), SamplesInCentroid(i))
        (updatedCentroid, updatedSamples, updatedError)
```

-continued

```
          centroid :=
              ref [|dkv.sample(rand(0));dkv.sample(rand(1));...;dkv.sample(rand(k−1))|]
          terminate := ref false
          iters := ref 0
          while (not !terminate) do
              let (newCentroid, newNumSamples, newError) =
                      DKV.fold fold_func aggregate_func
                          (!centroid, [|0;0;...;0|], [|0;0;...;0|]) dkv
              centroid := newCentroid
              iters := !iters + 1
              terminate := newError < threshold ||
                      iters > 100 ||
                      SumOverIndex_i(
                          SumOfSquares(newCentroid(i)-centroid(i))
                      ) < threshold2
      }
      Onenet.Run job
```

In the example pseudo code, DKV<index, float[ ]> (Name="Training set") includes the original data points. The program calls upon the DKV.fold system-defined function. DKV.fold accepts two user-defined functions, with signature fun GV->'T->GV, and fun GV, GV->GV, where GV is a global variable during the execution of the function step.

In the above k-means clustering program, the state is a global variable which is a 3-tuple of k-dimensional arrays, with the first element of the tuple being a k-dimensional array consisting of the k, d-dimensional vectors representing the k-centroids (or k-means). The second element in the tuple is a k-dimensional array with the i-th element in the array specifying the number of training data samples (from the original n, d-dimensional data points) which map to the i-th partition, which is the number of points where centroid(i) is the closest centroid. The final element in the 3-tuple is a k-dimensional array in which the i-th element corresponds to the error of the i-th partition, defined as the average sum of squares of the difference between points mapping to the i-th partition and the centroid. Mathematically, the error can be written as:
error(i)=AvgOverIndex_j (SumOfSquares(centroid(i)-JthSampleInCentroid(i, j))).

The first user-defined function, fold func, accepts the data set, e.g., the DKV, and a GV, which is a current list of centroids (c1, c2, . . . , ck). The first function outputs two GVs; the first GV is a new centroid list (c1, c2, . . . ck), and the second GV is a state, which includes a sum of the values of the data points in each of the k clusters, the number of data points assigned to each k cluster, and the error for each k cluster (e.g., the error based on the sum of squares for each k cluster).

When the program is first launched, the first GV is an initial list of centroids, which in the example program above is a random selection of data points from the DKV. Execution of the first user-defined function calls each data point in the DKV. The first user-defined function calculates the cluster membership of each data point using the current list of centroids (e.g., it calculates which of the current set of k clusters that the data point belongs to based on minimizing the distance between the data point and one of the current centroids), updates the state GV based on the list of data points that are determined to belong to one cluster, and updates the within-cluster sum of squares (e.g., updates the a sum of the values of the data points in each cluster, the number of data points assigned to each cluster, and the error for each cluster). Each node 102 produces its own list of centroids GV and its own state GV, which will then be aggregated.

The second user-defined function defines an aggregation function, and is called upon to aggregate the lists of centroids from the nodes into a single list of centroids, and to aggregate the state GV. In this case, the states are additive or, more generally, communicative in nature. If the GV values were not communicative, then the programmer (e.g., user 110) would need to account for that, such as by doing a sort to account for the proper order of operations. In the example program for k-means clustering, aggregating the state GV includes adding the sums of the values of the data points in each cluster, the numbers of data points assigned to each cluster, and the errors for each cluster. As described elsewhere within this Detailed Description, a communication tree may be formed to aggregate the GVs from the different nodes 102, such as by identifying leaf nodes, intermediate nodes, and head nodes, with leaf nodes passing their list of data points to the intermediate node, the intermediate nodes aggregating GVs using the second user-defined aggregation function, and the head node aggregating the lists from the intermediate nodes using the user-defined aggregation function. A communication tree is more scalable than other forms of communication, such as any-to-any communication.

At the completion of the iteration of the k-means clustering program, a new centroid list (c1, c1, c2, . . . , ck) is generated, together with the current within-cluster sum of square errors (e.g., a new state GV). The k-means clustering program iterates until either the within-cluster sum of squares is less than a threshold, or the number of iterations exceeds a certain predetermined threshold. At each iteration step, all nodes 102 determine new individual list of centroid GVs and new state GVs based on the key-value pairs that are stored on the individual nodes 102. The individual list of centroid GV and the individual state GVs are then aggregated to form an aggregated list of centroid GV and an aggregated state GV. Upon the iterations completing, a final list of centroid GV is output as a result of the computation of the program 112.

The distributed computing system 100 takes care of: establishing the communication links to distribute the initial values of the GVs (e.g., lists of centroids, and initial state, which may be set to 0); causing each node to apply the user-defined functions on the key-value pairs stored on each node 102; aggregating the resulting output GVs from each node 102; and distributing the current values of the GVs to the nodes 102 for each iteration step. The program above does not specify how these functions are done; rather the DKV.fold system-defined function is called, which takes care of these underlying distributed computing tasks, with the user-defined functions providing additional functions that are performed during the course of the system-defined function's operation, thereby giving the user the ability to control aspects of the computation. Thus, the user 110 has control over how the distributed computing functions are executed, but does not need to account for the underlying complexity of the distributed computing system 100 within the program 112.

The other example program is a search program, such as a web document search. Search engines use two indexes, a reverse index that is ordered by terms, and a forward index that is ordered by document id. The reverse index in this example is a DKV stored across the cluster by document, so that each node 102 contains a portion of the documents. The reverse index is stored as a DKV within the cluster with keywords/terms being the keys, and the values being the document identifiers of the documents in which the term appears, as well as the number of times that the term appears in each document. (Documents in this example are web pages, but they could be any type of document). The forward index, also stored as a DKV, includes a list of document identifiers (ids) as keys, and the values are the contents of the documents (e.g., the webpage contents).

An input GV into the example search program is a list of terms. The program determines a posting list (the document list associated with the list of terms). The determined document lists at each node 102 are aggregated together to find a posting list that includes the document ids of the documents that include all of the search terms. An L1 rank function is called upon so that only top K results are returned to the server. From the posting list, the forward index DKV is used to retrieve the document contents. A much more sophisticated L2 ranker function is called upon to determine the search rank of each document. The document is then displayed according to the rank.

Example pseudo code for the index serve program is as follows:

```
// Index serve
let job1 = OneNet {
    yield OneNetJob (Name = "Index serve")
    let dkv_inverse = DKV< term, posting_list > ( Name = "Inverse Index")
    let dkv_forward = DKV< docid, content > ( Name = "Forward Index")
    DKV.load dkv_inverse
}
OneNet.Run job
let job2 = OneNet {
    yield OneNetJob ( Name = "Index serve", Param=term_list )
    let dkv_inverse = DKV< term, posting_list > ( Name = "Inverse Index")
    let dkv_forward = DKV< docid, content > ( Name = "Forward Index")
    let res = DKV.index ( fun posting_lists -> L1_rank( posting_lists ) ) term_list
        dkv_inverse
    let contents = DKV.index ( fun content term_list -> rank( content, term_list ),
        term_list ) term_list (DKV.filterByKey ( fun docid -> docid in res )
        dkv_forward )
    { sort contents and present them according to rank }
}
OneNet.Run job term_lists
```

In the above example, the first job (job1) prepares the cluster for the index serve operation. It specifies the reverse index and the forward index as two separate DKVs. Since the reverse index is frequently consulted during execution of the program, it is loaded into memory (e.g., portions of the inverted index are loaded in a RAM of the nodes 102 of the cluster), which may be specified as a storage parameter.

In the second job, based on the user input GV (term_list), the DKV.index system-defined function is called upon. DKV.index is applied to the reverse DKV, and a global variable in the form of posting_lists for the user input GV (term_list) is obtained. The DKV.index function passes the retrieved posting lists to a user-defined function L1_rank(posting_lists), which aggregates the posting lists, and returns the top K L1 ranking results for each node as a GV.

The DKV.index system function is called a second time. The second DKV.index function call is applied to the term_lists, the forward index (which is also a DKV), and the returned posting list GV. For each document that is retrieved, the content and the user input term list will again be passed to a user-defined L2_rank function, in which the detailed rank of the content is calculated. The result is then aggregated as another GV and returned to a web front-end, which will sort the posting list for display based on the L2 ranking of each document in the posting list.

Figure 4:
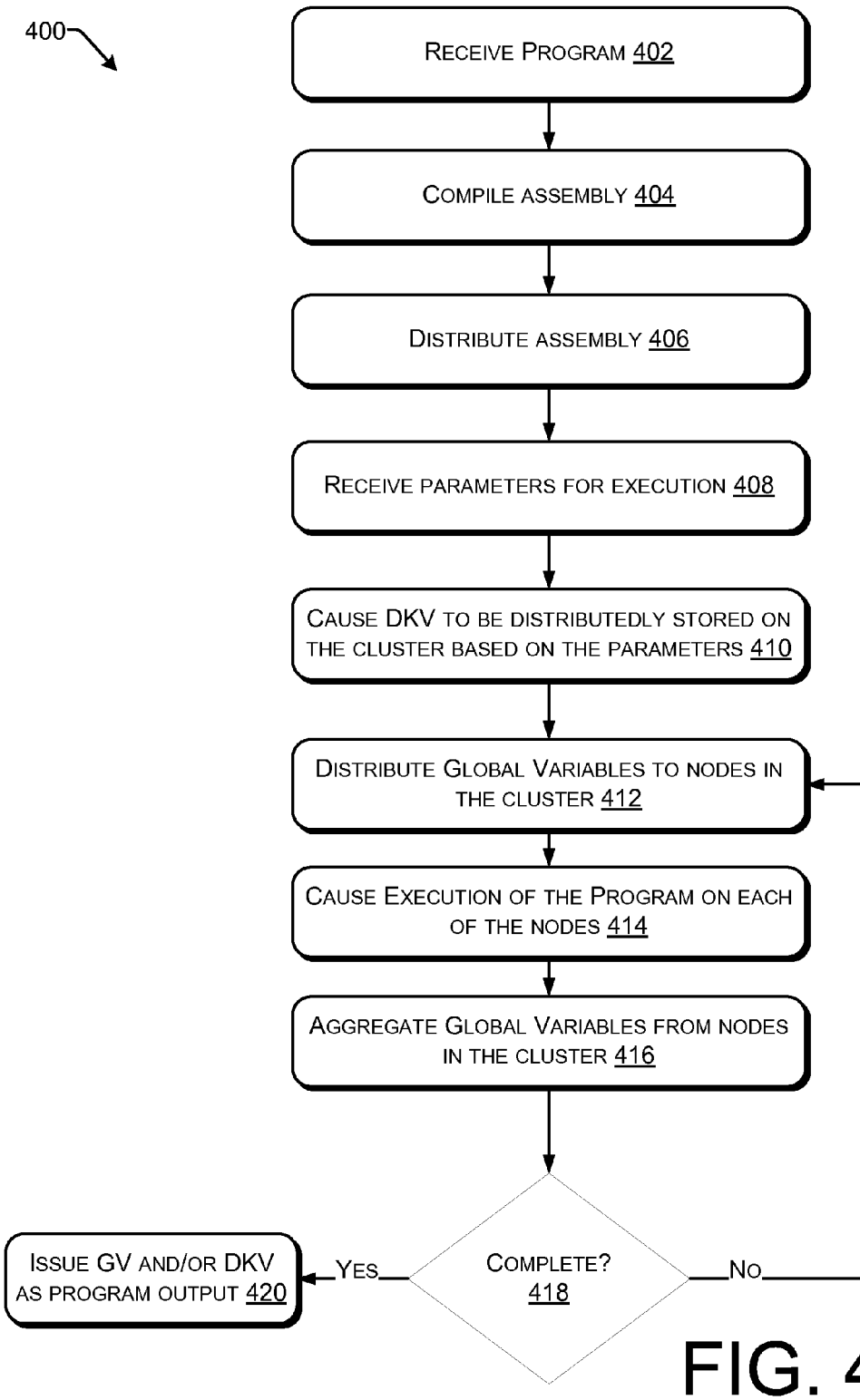
FIG. 4 depicts a flow graph that shows an example process for executing a distributed program written in functional style, in accordance with various embodiments.

Thus, the distributed functional programming environment allows the user 110 to write a variety of distributed programs in a functional style. The distributed computing system 100 supports programs that express computation on two entity types: DKVs and GVs. However, other distributed entity types, e.g., distributed tables, distributed b-trees, and others are also supported in various embodiments. In both cases, the system-defined functions are called upon to perform the complex underlying distributed computing tasks associated Example Processes FIG. 4 depicts a flow graph that shows an example process 400 for executing a distributed program written in functional style, in accordance with various embodiments. At 402, a distributed computing environment, such as the distributed computing system 100, receives a program that expresses computation upon one or more sets of distributed key-value pairs (DKVs) and one or more global variables (GVs). The program calls one or more primitive functions, e.g., kernel functions provided by the distributed computing environment. The program is received from a user device, and is written in a functional style.

At 404, the distributed computing system compiles the program and prepares an assembly. In various embodiments, the assembly includes one or more compiled code, (either managed or unmanaged), data files, configuration files, and so forth. The compiled code may include executable binaries for one or more processors types, such as CPUs of different types, GPGPUs, and so forth. The distributed computing system provides one or more system-defined functions, or primitives, that perform distributed computing functions on at least one of the one or more DKVs or the one or more GVs. The program being compiled calls one or more primitives, and the compilation of the program results in the system-defined functions being incorporated into the executable binary within the assembly. The system-defined functions may accept one or more user-defined functions that control how the distributed computing functions are performed on the DKVs and/or the GVs during the execution of the program.

At 406, the distributed computing system distributes the assembly, including the compiled program code, to each node of a computing cluster. The distributed computing system may set up one or more communication networks to distribute the assembly.

At 408, the distributed computing system receives one or more parameters for execution of the program. The parameters may be part of the program itself, or the parameters may be received separately from a user device. The one or more parameters may one or more of a storage property, a reliability property, or DKV partition property.

At 410, the distributed computing system causes different portions of the one or more DKVs to be stored on different ones of the plurality of nodes of the computing cluster, such as based at least on the execution parameters. The DKVs may already be stored across the cluster, and thus the DKV may not be separately stored based on an execution parameter. In any event, individual portions of the one or more DKVs are stored across the plurality of nodes of the computing cluster. In some embodiments, a storage property specifies a type of storage, such as a HDD, a SDD, RAM, and so forth, for storing at least one copy of at least one of the one or more DKVs. In the same or different embodiments, a reliability property specifies a number of copies of a DKVs to maintain within the cluster. Other example execution parameters are possible without departing from the scope of embodiments.

At 412, the distributed computing system distributes initial values one or more GVs to the nodes of the cluster prior to the execution of the assembly. One or more communication networks are established to distribute the GVs. The program may specify the values for initial values of the GV, or they may be randomly selected. The distributed computing system also distributes values for GVs during the execution of the program, such as after a program iteration, for further computation.

At 414, the distributed computing system causes execution of the assembly by each of the plurality of nodes of the computing cluster. The nodes execute the assembly upon the individual portions of the one or more DKVs stored thereon. Outcomes of the execution of the assembly by the plurality of nodes include a plurality of values for one or more GVs.

At 416, the distributed computing system aggregates the plurality of values for the particular one of the GVs into a single GV. The aggregation may occur based on the system-defined functions called by the program, although the program may specify a user-defined aggregation function that controls to some extent the aggregation process.

Until the program completes its execution, at 418, the distributed computing system distributes the values for the aggregated GVs, and continues executing the assembly upon the nodes of the cluster. Upon the program completing, the distributed computing system at 420 issues the GV and/or a new DKV as program output, such as by outputting a GV to a user device or by making the new DKV available for further computation.

Example Computing System

Figure 5:
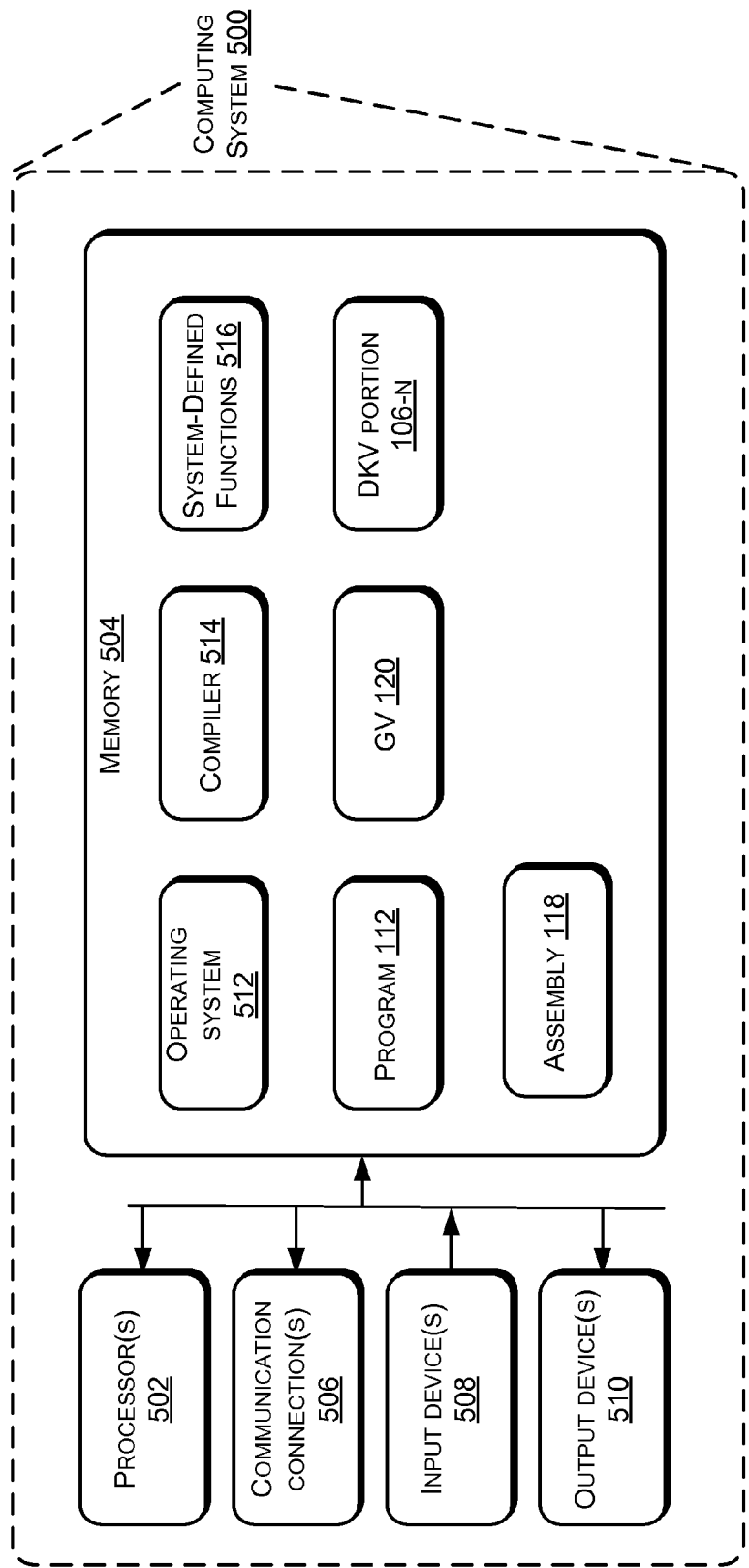
FIG. 5 is a block diagram of an example computing system usable to perform various methods described herein, in accordance with various embodiments.

FIG. 5 is a block diagram of an example computing system 500 usable to perform various methods described herein. The computing system 500 may be configured as any suitable computing device capable of implementing all or part of a decision tree scoring system, such as node 102 and/or the client device 116. According to various non-limiting examples, suitable computing devices may include personal computers (PCs), servers, server farms, datacenters, special purpose computers, combinations of these, or any other computing device(s) capable of storing and executing all or part of the distributed computing system described herein.

In one example configuration, the computing system 500 comprises one or more processors 502 and memory 504. The computing system 500 may also contain communication connection(s) 506 that allow communications with various other systems, such as other nodes of the distributed computing system. The computing system 500 may also include one or more input devices 508, such as a keyboard, mouse, pen, voice input device, touch input device, etc., and one or more output devices 510, such as a display, speakers, printer, etc. coupled communicatively to the processor(s) 502 and the memory 504.

The memory 504 may store program instructions that are loadable and executable on the processor(s) 502, as well as data generated during execution of, and/or usable in conjunction with, these programs. In the illustrated example, memory 504 stores an operating system 512, which provides basic system functionality of the computing system 500 and, among other things, provides for operation of the other programs and program modules of the computing system 500.

A compiler 514 compiles a program 112, and produces an assembly 118 as described elsewhere within this disclosure. Compiling the program 112 into the assembly 118 may include providing one or more system-defined functions 516, such as are described elsewhere within this description. The memory 504 may also store one or more GVs, such as the GV 120, and one or more DKV portions, such as the DKV portion 106-N.

Computer-Readable Media

Depending on the configuration and type of computing device used, memory 504 of the computing system 500 in FIG. 12 may include volatile memory (such as random access memory (RAM)) and/or non-volatile memory (such as read-only memory (ROM), flash memory, etc.). Memory 504 may also include additional removable storage and/or non-removable storage including, but not limited to, SSD (e.g., flash memory), HDD storage or other type of magnetic storage, optical storage, and/or tape storage that may provide non-volatile storage of computer-readable instructions, data structures, program modules, and other data for computing system 500.

Memory 504 is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission, non-communication medium that can be used to store information for access and retrieval by a computing device. In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method comprising:
receiving a program that expresses computation upon one or more sets of distributed key-value pairs (DKVs) and one or more global variables (GVs);
distributing an assembly that includes at least a compiled binary of the program to each of a plurality of nodes of a computing cluster, different portions of the one or more DKVs being stored across the plurality of nodes of the computing cluster; and
causing execution of the assembly by each of the plurality of nodes of the computing cluster, each of the plurality of nodes executing the assembly using the different portions of the one or more DKVs stored thereon.

2. The method of claim 1, further comprising:
receiving one or more parameters for execution of the program, the one or more parameters including one or more of a storage property, a reliability property, or DKV partition property; and
causing the different portions of the one or more DKVs to be stored on each of the plurality of nodes of the computing cluster based at least on one of the storage property, the reliability property, or the DKV partition property.

3. The method of claim 2, wherein the one or more parameters for execution of the program includes at least the storage property, the storage property specifying a type of storage for storing at least one copy of at least one of the one or more DKVs.

4. The method of claim 2, wherein the one or more parameters for execution of the program includes at least the reliability property, the reliability property specifying a number of copies of at least one of the one or more DKVs to maintain.

5. The method of claim 1, wherein outcomes of the execution of the assembly by each of the plurality of nodes of the computing cluster include a plurality of values for a particular one of the one or more GVs, the plurality of values produced by different ones of the plurality of nodes, the method further comprising aggregating the plurality of values for the particular one of the GVs into a single GV.

6. The method of claim 1, further comprising distributing a value for at least one of the one or more GVs to each of the nodes prior to the execution of the assembly.

7. The method of claim 1, further comprising providing one or more primitives that perform distributed computing functions on at least one of the one or more DKVs or the one or more GVs, the program calling at least one of the one or more primitives.

8. The method of claim 7, wherein at least some of the one or more primitives accept user-defined functions that control how the distributed computing functions are performed on at least one of the one or more DKVs or the one or more GVs during the execution of the program.

9. The method of claim 1, wherein the plurality of nodes include one or more of computing systems or one or more virtual machines.

10. A computing system comprising:
a plurality of computing nodes, different ones of the plurality of computing nodes storing different portions of a distributed key-value pair set (DKV), the plurality of computing nodes including one or more processors and one or more modules stored in memory, the one or more modules executable by the one or more processors to:
receive, from a client, a program or a compiled binary of the program, the program expressing computation upon the DKV and one or more global variables (GVs);
distribute an assembly that includes at least the compiled binary of the program to each of the plurality of computing nodes; and
cause each of the plurality of computing nodes to execute the assembly, the different ones of the plurality of computing nodes executing the assembly upon the different portions of the one or more DKVs stored thereon.

11. The computing system of claim 10, wherein the one or more modules are further executable by the one or more processors to:
receive one or more execution parameters for execution of the program, the one or more execution parameters including one or more of a storage property, a reliability property, or DKV partition property; and
store the DKV amongst the plurality of computing nodes according to the one or more execution parameters.

12. The computing device of claim 10, wherein the one or more modules are further executable by the one or more processors to:
distribute, prior to execution of the assembly by the plurality of computing nodes, the GV, each of the plurality of computing nodes executing the assembly upon the GV.

13. The computing system of claim 10, wherein execution of the assembly by each of the plurality of computing nodes produces a plurality of corresponding values for the GV, and the one or more modules are further executable by the one or more processors to:
aggregate the plurality of corresponding values for the GV from each of the one or more of the plurality of computing nodes into an aggregated GV; and
provide the aggregated GV to the client device.

14. The computing device of claim 13, wherein the one or more modules are further executable by the one or more processors to aggregate the plurality of corresponding values for the GV by at least forming a tree communication structure for the plurality of computing nodes, wherein an intermediate one of the plurality of computing nodes in the tree communication structure receives an aggregated GV from a downstream node, performs an aggregation function to aggregate the aggregated GV from the downstream node and its own value for the GV, and to pass a resulting new aggregated value for the GV to an upstream one of the computing nodes.

15. The computing system of claim 10, wherein logic of the program calls one or more primitive functions provided by the computing system, the one or more primitive functions accepting user-defined functions that control how functions of the one or more primitives are performed on one or more of the DKV or the GV during the execution of the program.

16. One or more computer-readable storage media storing a plurality of instructions executable by one or more processors of a computing system to:
receive a program, or a compiled binary of the program, from a client device, the program expressing computation upon a set of distributed key-value pairs (DKV) and a global variable (GV);
distribute an assembly including at least the compiled binary of the program to a plurality of computing nodes of a cluster, the cluster distributedly storing the DKV; and cause the assembly to execute, on each of the computing nodes of the cluster, each computing node of the cluster executing the program against a subset of the DKV stored thereon.

17. The one or more computer-readable storage media of claim 16, wherein the plurality of instructions are further executable by the one or more processors of the computing system to distribute an initial value of the GV to the plurality of computing nodes of the cluster, distribution of the initial value of the GV initiating execution of the assembly on each of the computing nodes.

18. The one or more computer-readable storage media of claim 17, wherein each of the plurality of computing nodes of the clusters, upon execution of the assembly, produces a plurality of corresponding outcome values for the GV, the plurality of instructions further executable by the one or more processors of the computing system to aggregate the corresponding outcome values for the GV into an aggregated value for the GV.

19. The one or more computer-readable storage media of claim 16, wherein each of the plurality of computing nodes of the clusters, upon execution of the assembly, produces corresponding outcome values for the GV, the plurality of instructions further executable by the one or more processors of the computing system to:
aggregate the corresponding outcome values for the GV into an aggregated GV by at least an intermediate node of a tree communication structure receiving an aggregated GV from a downstream node, performing an aggregation function on the received aggregated GV and a local value of the GV to produce a new aggregated value of the GV, and passing the new aggregated value of the GV to an upstream node of a tree communication structure.

20. The one or more computer-readable storage media of claim 16, wherein the program calls a primitive function provided by the cluster, the primitive function accepting one or more user-defined functions that control how distributed computing functions are performed on one or more of the DKV or the GV during the execution of the program.

* * * * *